(12) United States Patent
Yamamoto

(10) Patent No.: US 6,457,351 B1
(45) Date of Patent: Oct. 1, 2002

(54) HYBRID ELECTRIC VEHICLE TESTING METHOD AND SYSTEM

(75) Inventor: Koji Yamamoto, Kanagawa-ken (JP)

(73) Assignee: Nissan Motor Co., Ltd., Kanagawa-ken (JP)

(*) Notice: Subject to any disclaimer, the term of this patent is extended or adjusted under 35 U.S.C. 154(b) by 0 days.

(21) Appl. No.: 09/398,430

(22) Filed: Sep. 17, 1999

(30) Foreign Application Priority Data

Sep. 18, 1998 (JP) .......................................... 10-265324

(51) Int. Cl.⁷ ................................................ G01L 3/26
(52) U.S. Cl. ........................................ 73/116; 73/117
(58) Field of Search ....................... 73/116, 117, 118.1, 73/862.17, 862.18, 862.13, 862.08, 862.09

(56) References Cited

U.S. PATENT DOCUMENTS 4,442,708 A * 4/1984 Gable et al. ................... 73/117
4,870,585 A * 9/1989 Manzolini ..................... 73/116

* cited by examiner

*Primary Examiner*—Benjamin R. Fuller
*Assistant Examiner*—Maurice Stevens
(74) *Attorney, Agent, or Firm*—McDermott, Will & Emery

(57) ABSTRACT

A hybrid electric vehicle is placed in a running condition on a chassis dynamometer, a vehicle-end data is acquired by access to sensors in the vehicle, a dynamometer-end data is acquired by measurements at the chassis dynamometer, and the vehicle-end data and the dynamometer-end data are analyzed for inspections of drive and control systems of the vehicle.

10 Claims, 13 Drawing Sheets

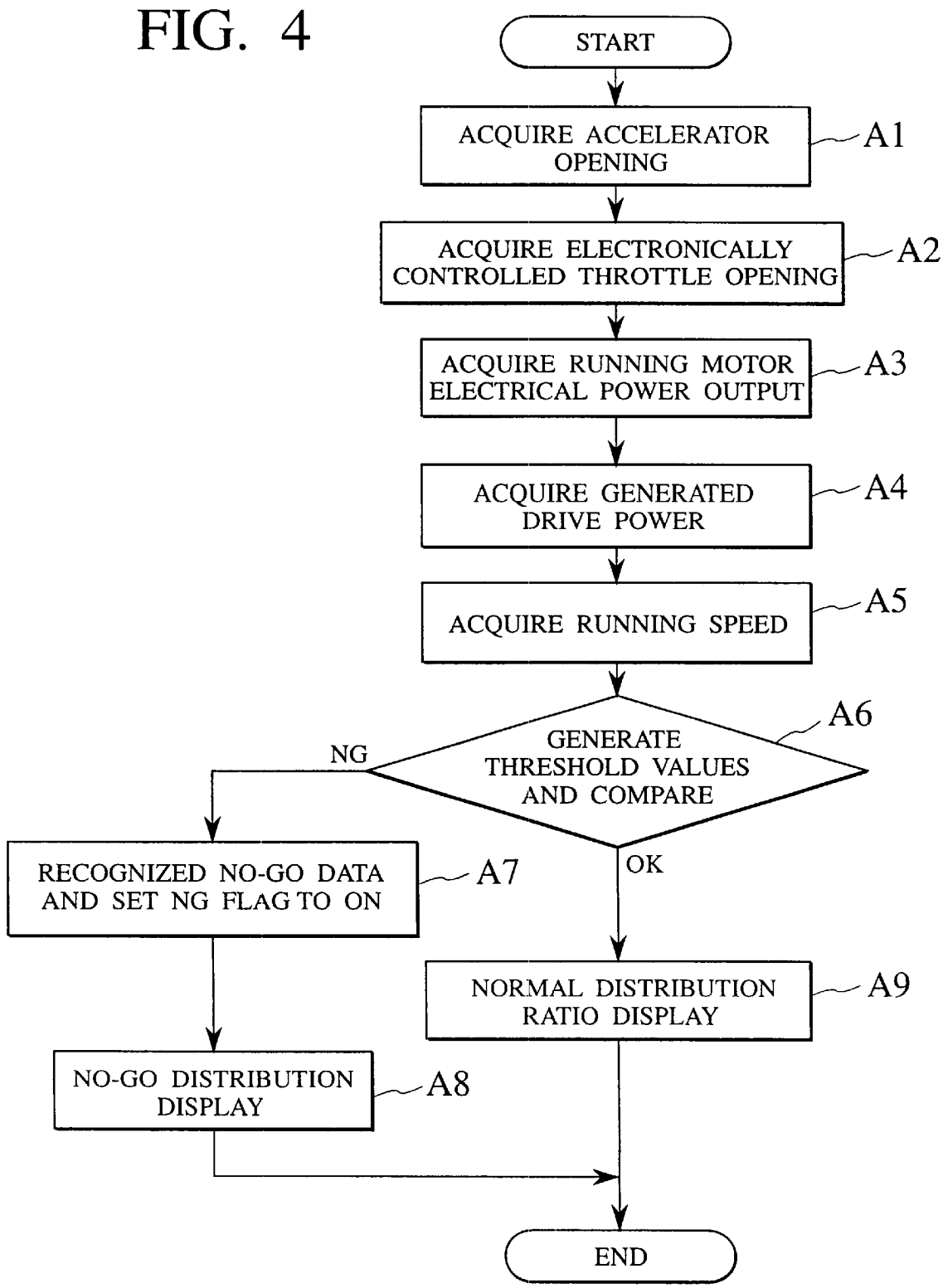

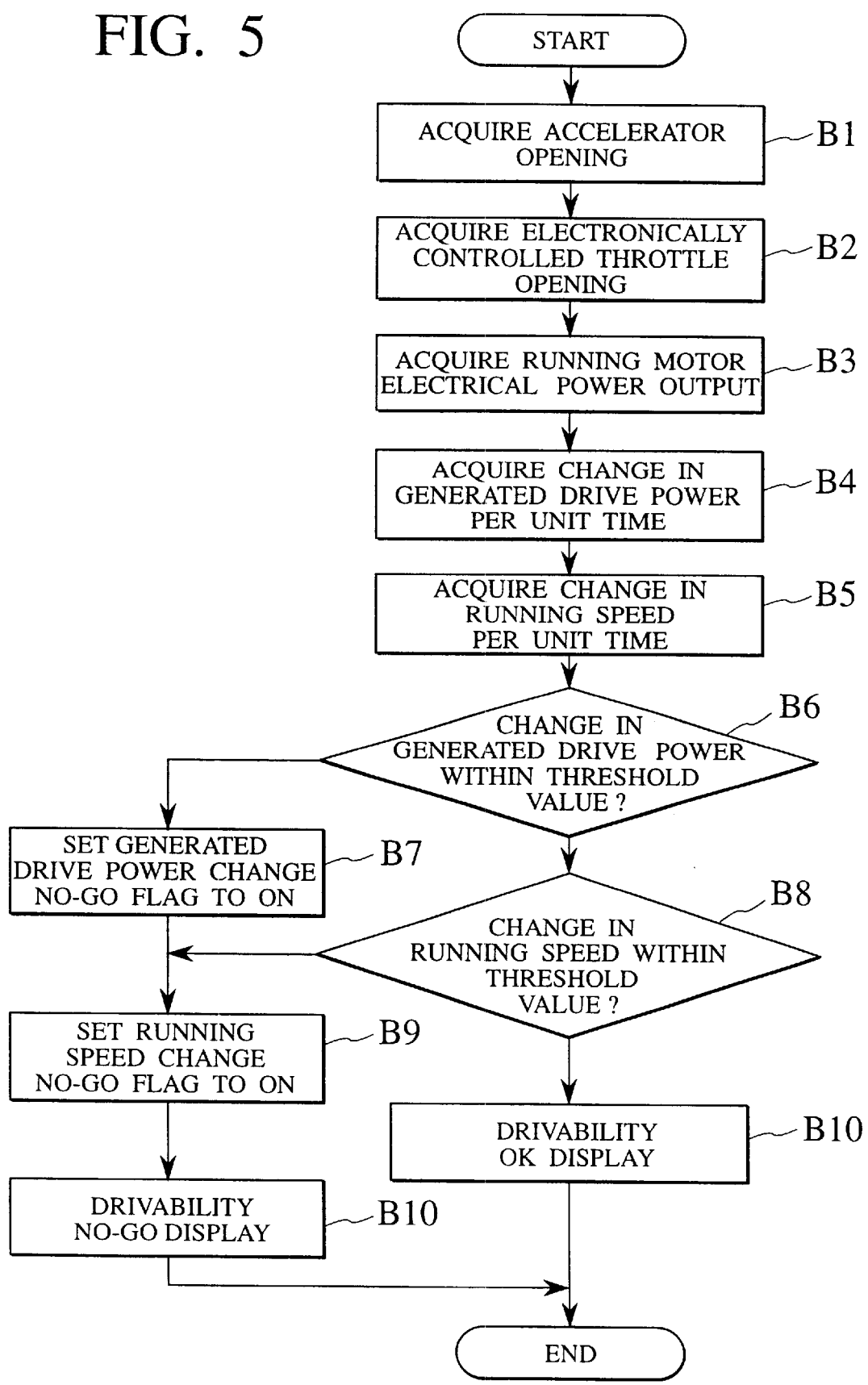

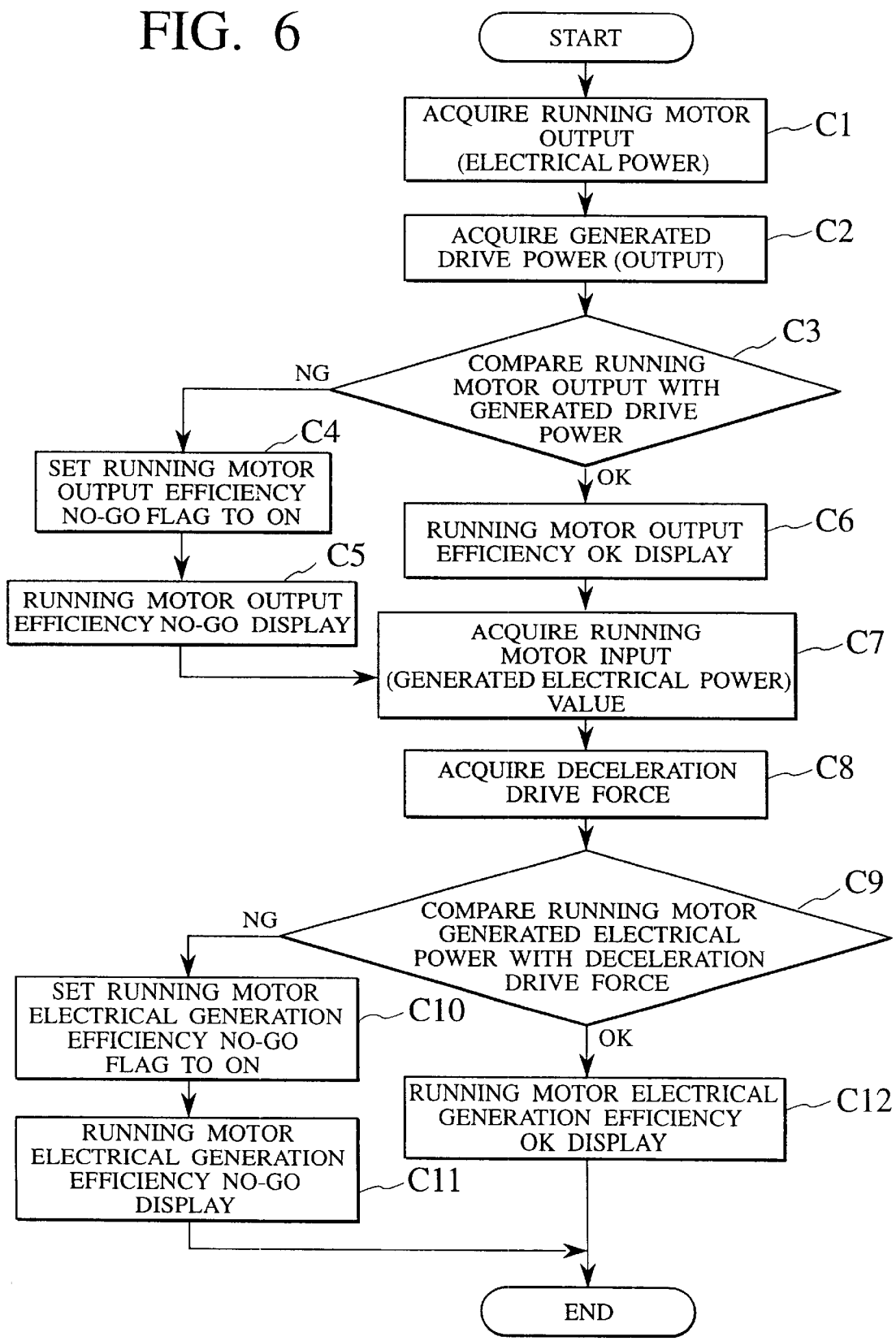

HYBRID ELECTRIC VEHICLE TESTING METHOD AND SYSTEM

BACKGROUND OF THE INVENTION

The present invention relates to a hybrid electric vehicle testing method and a hybrid electric vehicle testing system, and particularly, to a testing method of and a testing system for testing a drive system and a control system of a hybrid electric vehicle (hereafter sometimes simply called "hybrid vehicle") which is run under integrated control of an engine and an electric motor.

In recent years, hybrid vehicles have been developed, which run under integrated control of both an engine and an electric motor. These hybrid vehicles contribute to savings in energy resources and protect the environment. In a hybrid vehicle, switching is performed between the engine and an electric motor in accordance with various actions, such as starts, accelerations, constant-speed running, decelerations, and stops, and regenerative braking is used to store the energy of deceleration, thereby providing a great improvement in fuel economy and a reduction in exhaust emissions.

SUMMARY OF THE INVENTION

For such hybrid vehicles, testing is performed, not only at the manufacturing stage, but also for the purpose of maintenance. However, there has not been a method nor a system developed for performing tests of the complex drive system and control system of such a hybrid vehicle.

Accordingly, it is an object of the invention to provide a testing method of and a testing system for testing a hybrid vehicle, whereby a variety of tests are performed on a drive system and a control system of the vehicle while it is in a simulated running condition.

To achieve the object, an aspect of the invention provides a testing method of testing a hybrid electric vehicle which runs under integrated control of an engine and an electric motor for run and which includes drive and control systems therefor, the testing method comprising having the vehicle running on a stationary running tester, acquiring first data on the running vehicle by access to sensors in the vehicle and second data on the running vehicle by measurements thereto at the tester, and analyzing the first and second data to inspect the drive and control systems.

Another aspect of the invention provides a testing system for testing a hybrid electric vehicle which runs under integrated control of an engine and an electric motor for run and which includes drive and control systems therefor, the testing system comprising: a stationary running tester for the vehicle to run thereon, a first data acquisition system to acquire first data on the vehicle running on the tester by access to sensors in the vehicle, a second data acquisition system to acquire second data on the running vehicle by measurements thereto at the tester, and an analysis system to analyze the first and second data for an inspection of the drive and control systems.

According to the above-noted aspects, a hybrid electric vehicle is placed in a simulated running condition on a stationary running tester that may be a chassis dynamometer, sensors in the running vehicle are accessed to acquire firs data thereon as vehicle-end data, measurements are made to the running vehicle to acquire second data thereon as tester-end data, and the first and second data are analyzed for an inspection to make a decision on a conformity of drive and control systems of the vehicle.

Accordingly, it is allowed, for example, to perform a test of a drive distribution ratio between an engine and an electric motor for run, to achieve a quantitative evaluation of drivability for the vehicle to run, or to estimate or predict running efficiencies of the electric motor and a battery, a control efficiency of regenerative braking, a battery discharge efficiency, an auxiliary equipment drive control condition, an engine startup control condition, or a fuel consumption, thereby facilitating improvements in hybrid vehicle quality and maintenance.

BRIEF DESCRIPTION OF THE ACCOMPANYING DRAWINGS

The above and further objects and novel features of the present invention will more fully appear from the following detailed description when the same is read in conjunction with the accompanying drawings, in which.

FIG. 4 is a flowchart of a process for the testing system to determine a drive distribution ratio between an engine and a running motor of the hybrid vehicle;

FIG. 5 is a flowchart of a process for the testing system to determine a drivability of the hybrid vehicle;

FIG. 6 is a flowchart of a process for the testing system to determine operating efficiencies of the running motor and a battery of the hybrid vehicle;

DETAILED DESCRIPTION OF THE PREFERRED EMBODIMENTS

Figure 1:
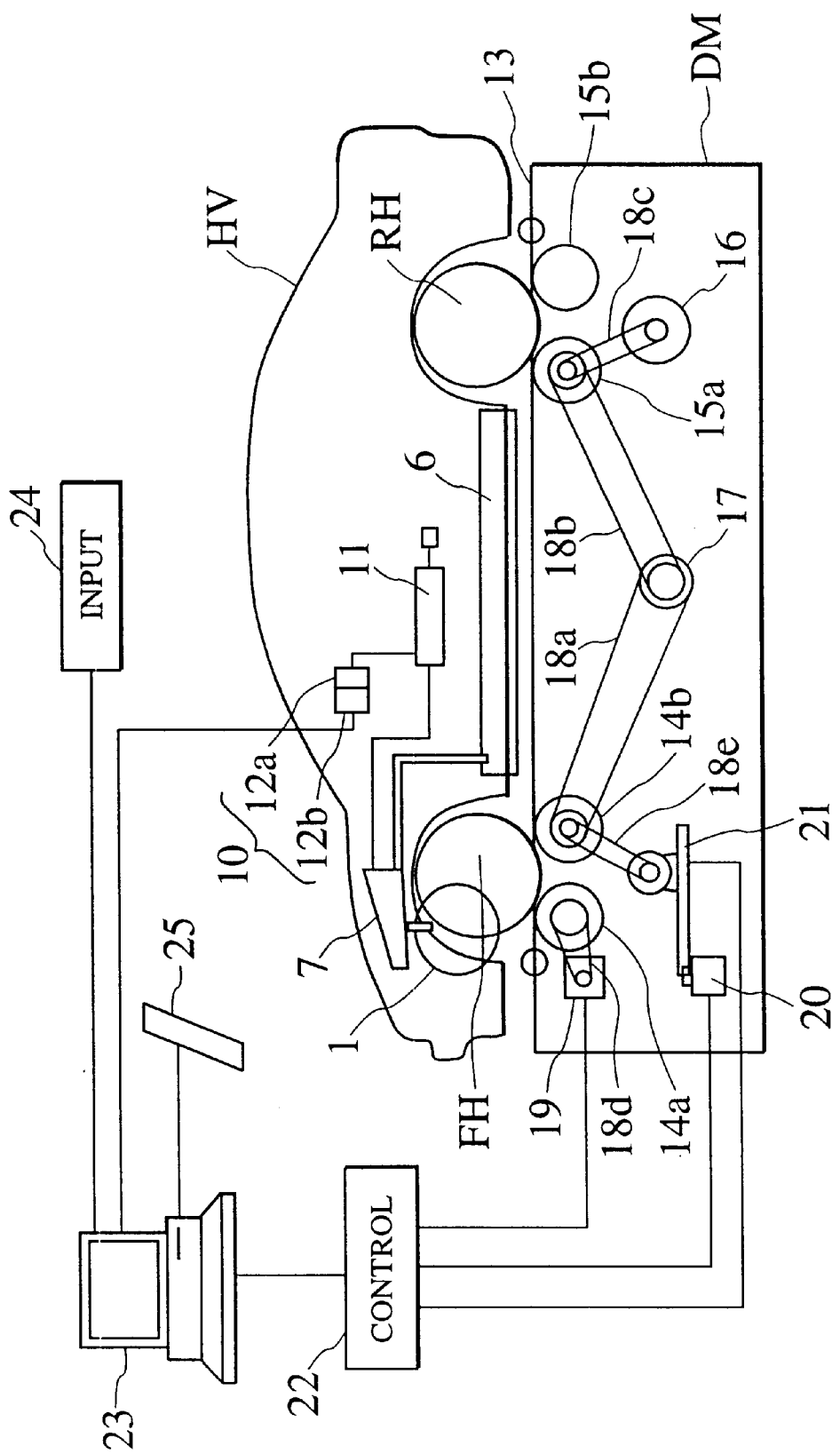
FIG. 1 is a schematic elevation of a testing system for testing a hybrid vehicle according to an embodiment of the invention.

There will be detailed below the preferred embodiments of the present invention with reference to the accompanying drawings. Like members are designated by like reference characters.

Figure 2:
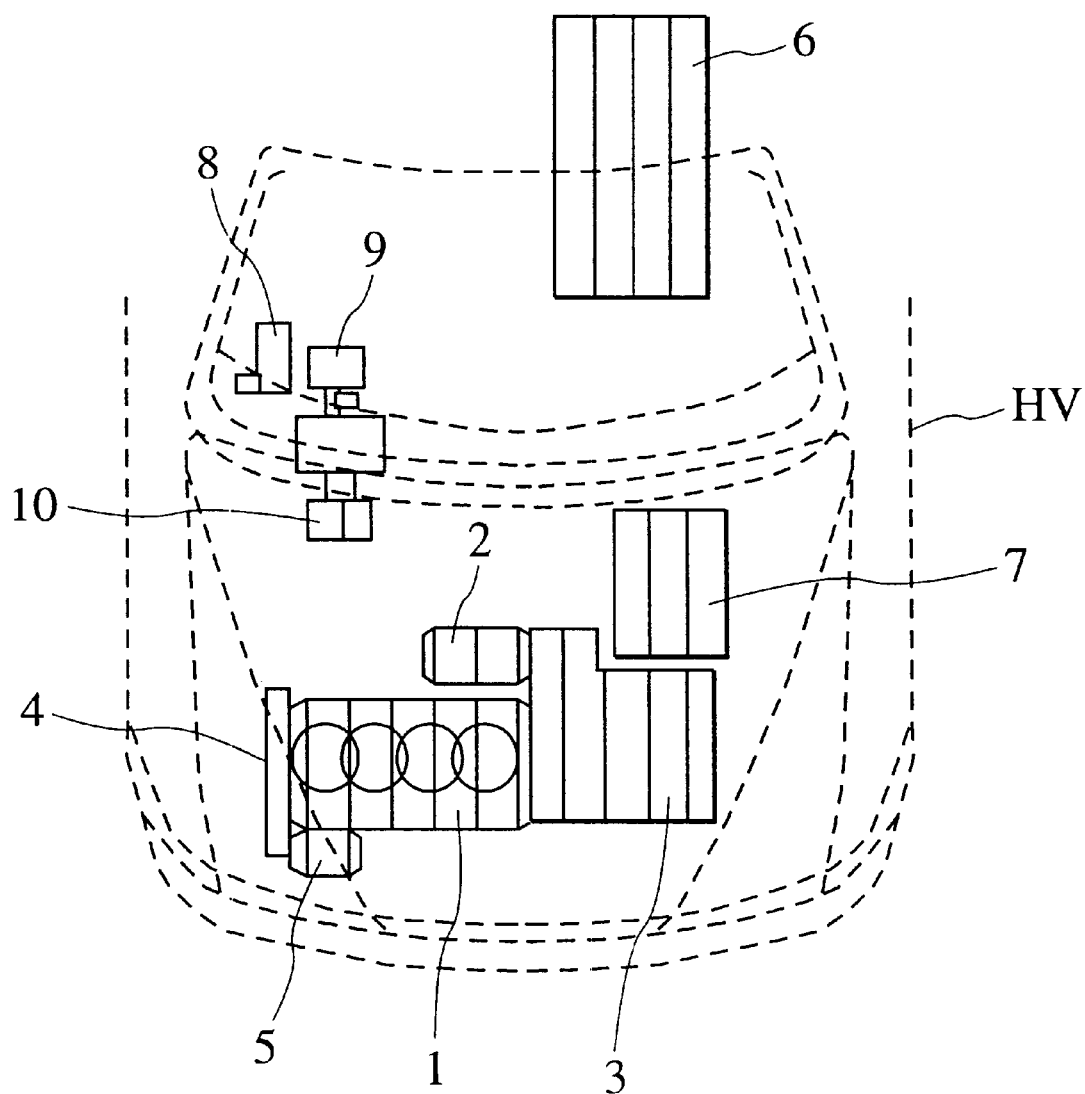
FIG. 2 is a schematic plan of drive and control systems of the hybrid vehicle.

FIGS. 1 and 2 illustrate a testing system for testing a hybrid vehicle HV according to an embodiment of the invention, and drive and control systems of the hybrid vehicle HV, respectively.

The hybrid vehicle HV has drive and control systems that include an engine 1 as the main motive drive source, an electric motor 2 for run (hereafter sometimes "running motor"), which serves also as an electrical generator, a stepless transmission 3, an auxiliary clutch 4 and auxiliary motor 5 which perform switching between the engine 1 and the running motor 2, a battery 6, an inverter 7 that is provided between the running motor 2 and the battery 6, an electronically controlled accelerator 8, a brake pedal 9, and a brake fluid pressure-adjusting valve 10, integrated control of the engine 1 and the running motor 2 being performed so as to drive the hybrid vehicle HV.

Various sensors are provided at the constituent elements of the drive and control systems of the hybrid vehicle HV, these sensors being capable of detecting as vehicle data the conditions of the vehicle, as typified by such items as the running speed, the accelerator input, the brake pedal stroke, the shift position, the brake fluid pressure, the electronically control throttle opening, the stepless transmission gear shift position, the stepless transmission electromagnetic clutch operation, the running motor output electrical power, the running motor generated electrical power, the battery voltage, the battery charging power, the battery discharging power, the auxiliary clutch operation, and the auxiliary motor rpm. This vehicle data is input to a controller 11 that is mounted in the vehicle, and can be output to outside the vehicle, via the output section 12a of a diagnosis connector 12.

A four-wheel chassis dynamometer DM is used in the testing of the drive and control systems of the above-noted hybrid vehicle HV. A stage 13 of the dynamometer DM has the pair of front rollers 14a and 14b that accept the front wheels FH of the hybrid vehicle and the pair of rear rollers 15a and 15b that accept the rear wheels RH of the hybrid vehicle, a roller drive unit 16 and a rotation transmission roller 17 being provided at the bottom of the stage 13. Additionally, rotation transmission belts 18a through 18c are provided between one of the front rollers 14b and the rotation transmission roller 17, between the rotation transmission roller 17 and one of the rear rollers 15a, and between one of the rear rollers 15a and the roller drive unit 16, respectively.

At the bottom part of the stage 13, are provided a running speed detector 19, a drive power detector 20, and a road load generator 21. The running speed detector 19 detects the running speed from the rotation of the other front roller 14a, via a belt 18d. The rotation of the front roller 14b is input to the drive power detector 20 and the road load generator 21 via a belt 18e. The running speed detector 19, the drive power detector 20, and the road load generator 21 detect the running speed, the drive power, and the road load, and input these quantities as measured data to an instrumentation controller 22.

The above-noted measured vehicle data and chassis dynamometer measured data are input to a main controller 23 of the inspection apparatus. The measured vehicle data is input via the input section 12b that is attached to the output section 12a of the diagnosis connector 12. The chassis dynamometer measured data is input as is from the instrumentation controller 22. The main controller 23 has input to it various data from a vehicle-type information input unit 24, depending upon the vehicle type, and has a display 25 connected to it which displays the test results. A threshold value is input to the main controller 23 to enable a go/no-go rest based on various acquired data values.

To perform a test of the drive and control systems of the hybrid vehicle HV, the hybrid vehicle is placed on the chassis dynamometer and placed in a simulated running condition, vehicle data being then collected from sensors mounted on the vehicle and measured data being acquired by the chassis dynamometer as well. The main controller 23, based on appropriately selected measured vehicle data and measured data from the chassis dynamometer, performs tests of the drive system and control system, including drive distribution between the engine and the electric motor, quantitative evaluation of drivability while running, running motor and battery operating efficiencies, regenerative braking control efficiency, battery charge discharge efficiency, auxiliary equipment drive control condition, engine startup control condition, and fuel consumption. In the main controller 23, a comparison is performed between measured values and pre-established threshold values, so as to perform a go/no-go test, the results of this test being displayed on the display 25. This provides a clear indication of the location and degree of problems, enabling such action as parts replacement or adjustments to be taken.

FIGS. 3A to 3D illustrate an energy flow, arrangement, actions and characteristics of principal components of the drive and control systems of the hybrid vehicle HV. In these figures, a motor A serves as the running motor 21 for run and power regeneration, and a motor B serves as the auxiliary motor 5 for startup and power generation.

Figure 3A:
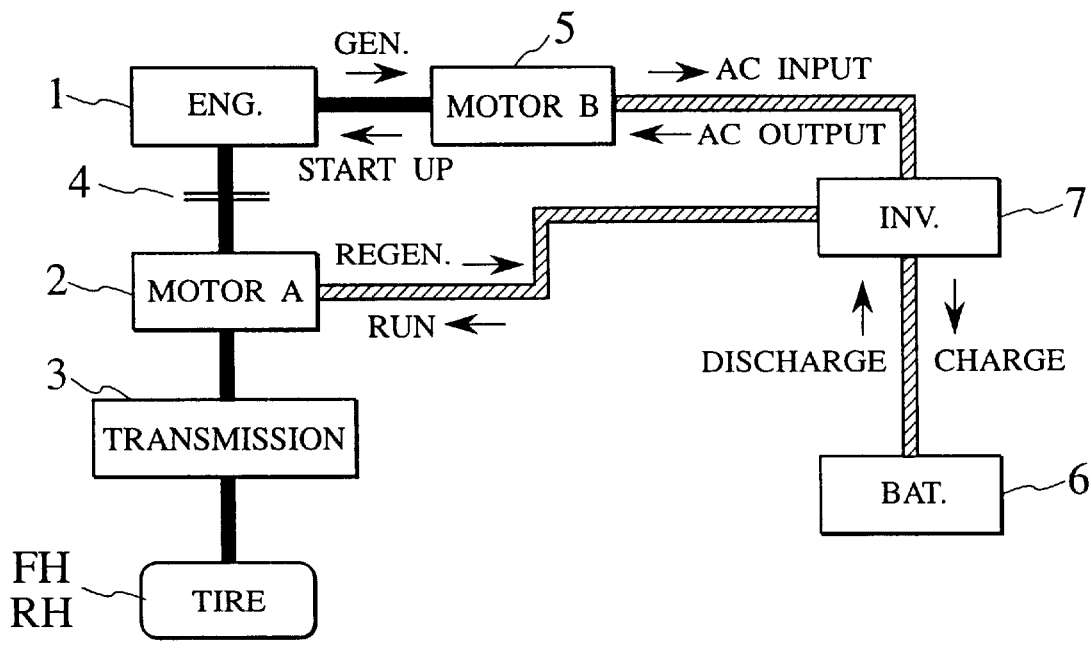
FIG. 3A is an energy flow diagram of the drive and control systems.
Figure 3B:
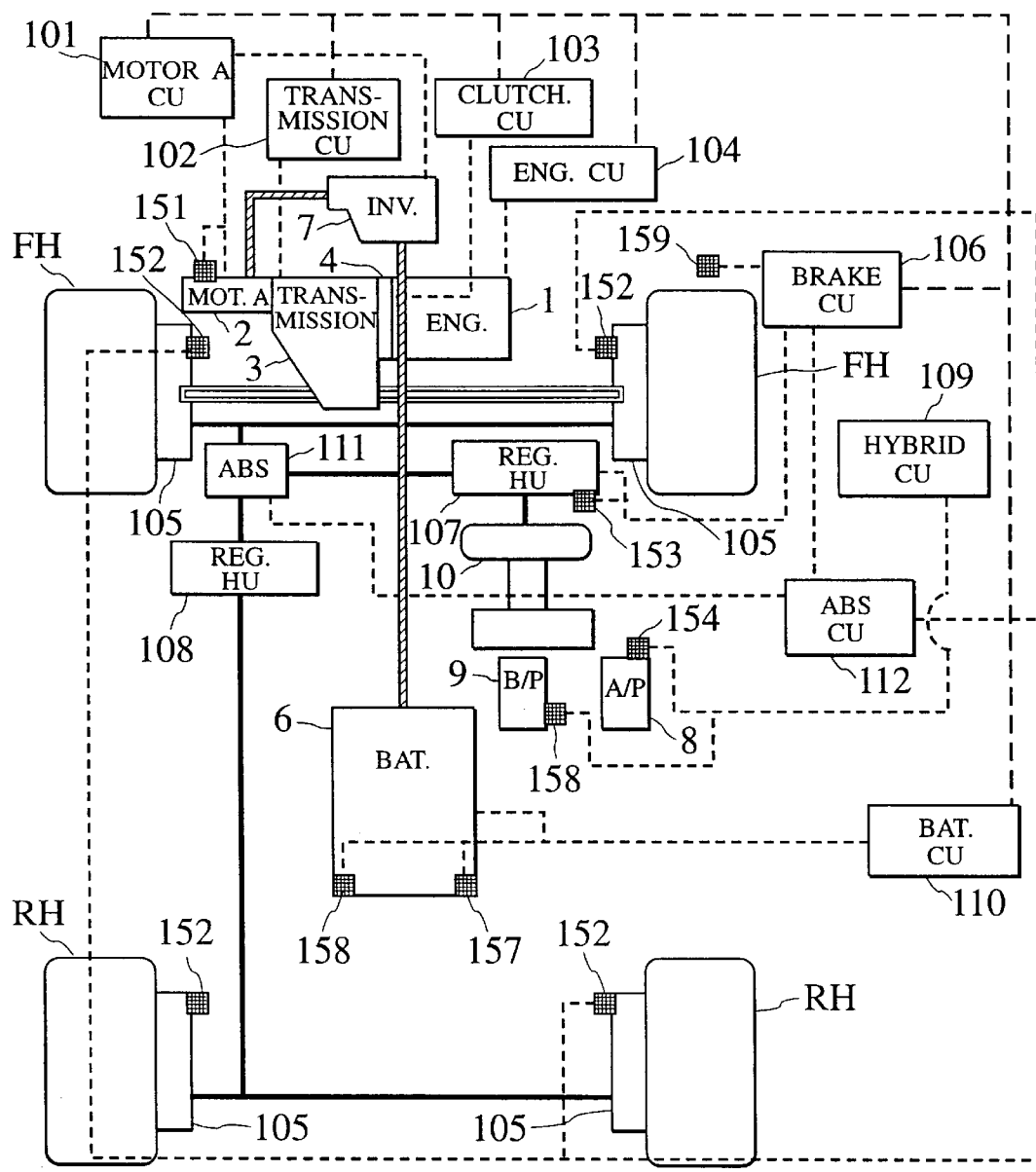
FIG. 3B is a block diagram of the drive and control systems.

As illustrated in FIGS. 3A and 3B, a hydraulic system transmits drive energy from the engine 1 to be started with the motor B and/or from the motor A connectable to the engine 1 through the magnetic clutch 4 to the tires FH and/or RH, via the transmission 3 of a continuously speed-variable type as the engine 1 rotates, AC power is generated at the motor B, which provides the AC power to or receives AC power from an electric power system, where the battery 6 is charged or discharges via the inverter 7 and the motor A receives electric power for drive or provides regenerated power. A signal control system and an internal vehicular LAN (local area network) interconnects a control unit (CU) 101 of the motor A, a transmission CU 102, a clutch CU 103, an engine CU 104, brakes 105, a brake CU 106, regeneration hybrid units 107 and 108, a hybrid CU 109, a battery CU 110, an ABS 111 and an ABS CU 112, as well as a motor-A rotational phase sensor 151, tire rotation sensors 152, hydraulic pressure sensors 153, an acceleration sensor 154, G (gravity) sensors 155, a battery cell temperature sensor 156, a battery cell voltage sensor 157, and a brake switch 158.

Figure 3C:
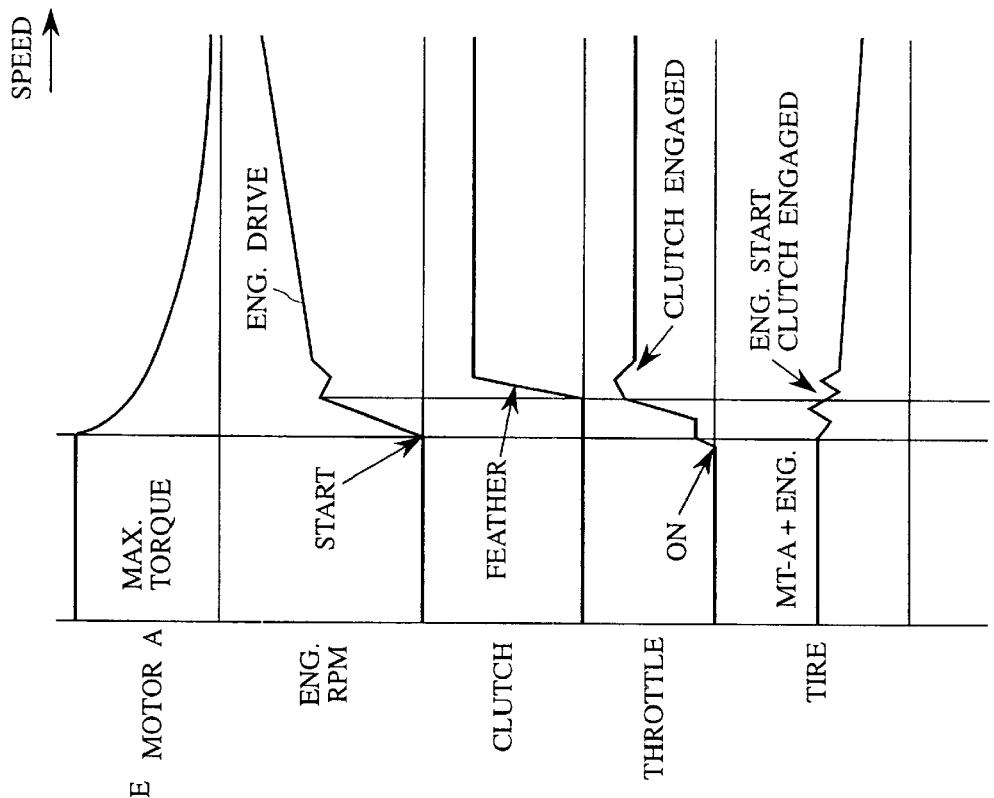
FIG. 3C is a combination of time charts of actions of the drive and control systems.

During a continuous battery load test shown in FIG. 3C, the hybrid vehicle HV runs with the motor A and the engine in a stopped state. With occurrence of an output of the motor A, the battery has a lowered charge amount. When the battery charge amount approaches a discharge limit, an on-board computer raises the engine output, which starts electrical generation by the motor B, and reduces the output of motor A. If the timing of increase of output of the engine, increase in amount of generation by motor B, or decrease of output of the motor A were improper, variations in tire drive power had occurred, adversely affecting the drivability. As the control data are monitored the cause of poor control is identifiable when the variation in drive power exceeds a threshold value (for example, when the reduction in output of motor A is too late).

Figure 3D:
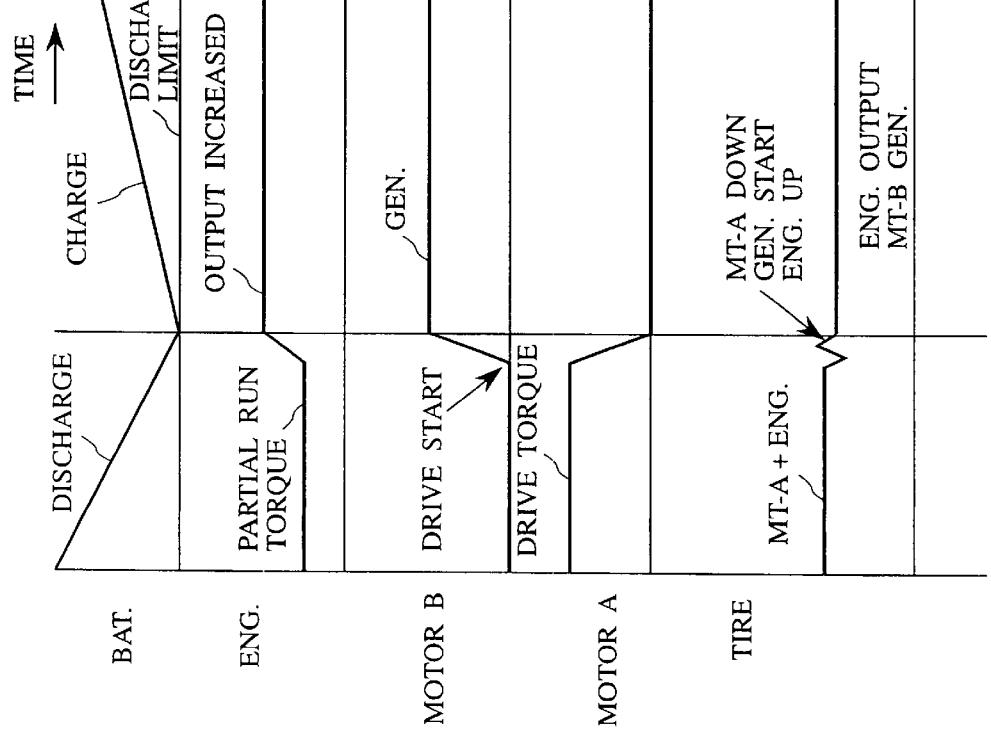
FIG. 3D is a combination of diagrams representative of vehicle-speed-dependant characteristics of the drive and control systems.

A switching from motor drive to engine drive is illustrated in FIG. 3D, from the start of motor A until switching-over to drive by the engine. Acceleration is started with motor A. At a given speed region, when the motor torque becomes insufficient, the engine is started and the electromagnetic clutch is smoothly engaged, so as to switch over to drive by the engine. An electronically controlled throttle opening depends on the engine torque control. If the timing of decrease in motor A torque, increase in engine torque, or engagement of the clutch were improper, the tire drive power had exhibited variations, adversely affecting the drivability. The control data are monitored, so as to identify the cause of poor control with the variation in drive power exceeds a threshold value (for example, when the engagement of clutch is too quick).

FIGS. 4 through 11 show flowcharts of processes for the testing system to follow for inspections of the drive and control systems of the hybrid vehicle HV.

FIG. 4 is a flowchart that shows the process of detecting the drive distribution ratio of the engine 1 and the running motor 2. At Steps A1, A2, and A3, the opening of the accelerator 8, the electronically controlled throttle opening, and the output electrical power of the running motor 2, respectively, are acquired as data from the vehicle. Next, at steps A4 and A5, the generated drive power and running speed, respectively, are acquired as data at the chassis dynamometer. The relationship of the test running mode accelerator input (opening), the running speed and road load to the output generated by the running motor 2 is mapped and, at step A6, a comparison is performed with respect to a designed (threshold) value, thereby performing a no/no-go test of the drive distribution ratio of the engine 1 and the running motor 2.

If a problem (no-go result, indicated as NG in this and subsequent flowcharts) occurs at step A6, the no-go data is recognized at step A7, an NG flag being set to on, and at step A8 a display is made that indicates that the drive distribution ratio result was no-go. In the case, however, in which there was no problem detected at step A6 (OK result shown in this and subsequent flowcharts), the display is made at step A9 indicating the OK result.

FIG. 5 is a flowchart that shows the process of detecting the drivability of the hybrid vehicle HV. At steps B1, B2, and B3, the input (opening) of accelerator 8, the electronically controlled throttle opening, and the output electrical power of the running motor 2, respectively, are acquired as measured data from the vehicle. At steps B4 and B5, the amount of change in generated drive power per unit time and the amount of change in running speed per unit time, respectively, are acquired as data measured at the chassis dynamometer.

At step B6, a judgment is performed as to whether or not the change in generated drive power is within a threshold value. Making use of the fact that poor drivability manifests itself as a sudden change in the amount of generated drive power, a threshold value of the change in the amount of generated drive power is set. At step B6, if the change in generated drive power is judged to be outside of this threshold value ("no result"), an NG (no-go) flag is set to on at step B7 as a result of this sudden change in generated drive power.

If the judgment at step B6, however, is that the change in generated drive power is within the threshold value ("yes" result), a further judgment is made, at step B8, as to whether or not the running speed is within a threshold value. Making use of the fact that poor drivability manifests itself as a change in running speed, a threshold value of the change in running speed is set. If at step B8 the judgment is made that the change in running speed is not within the threshold value ("no" result), an NG (no-go) flag is set to on at step B9 as a result of the change in running speed. If, however, the judgment is made at step B8 that the running speed is within the threshold value ("yes" result), a display that the drivability is normal (OK) is made at step B11.

FIG. 6 is a flowchart that shows the process of detecting the operating efficiencies of the running motor 2 and the battery 6 of the hybrid vehicle HV. In this case, because a test is only made of the electronically controlled parts, an active test is performed, with the drive of the engine 1 as zero. At step C1 the output (electrical power) of the running motor 2 is acquired as measured data from the vehicle, and at step C2 the generated drive power (output) is acquired as data measured at the chassis dynamometer. A comparison is then made at step C3 between the output of the running motor 2 and the amount of generated drive power. That is, by making a comparison of the electrical power consumed by the running motor 2 and the amount of drive power that is generated, the efficiency is calculated, this efficiency being used as the basis for a go/no-go test with respect to a threshold value.

If at step C3 a judgment is made that there is a problem (NG result), at step C4 the output efficiency of the running motor 2 causes an NG (no-go) flag to be set to on, and the "no-go" running motor 2 output efficiency result is displayed at step C5, after which control proceeds to step C7. If, however, the result of the judgment at step C3 that no problem has occurred (OK result), the fact that the output efficiency of the running motor 2 is ok is displayed at step C6, at which point control proceeds to step C7.

At step C7, the input value (amount of generated electrical power) of the running motor 2 is acquired as measured data from the vehicle, and at step C8 the deceleration drive power is acquired as data measured at the chassis dynamometer. A1 this point, the regeneration efficiency (electrical power generating efficiency) when decelerating is tested at step C8, an active test being used in the deceleration mode, with only the running motor 2 generating electrical power. At step C9 a comparison is made between the amount of electrical power generated by the running motor 2 and the deceleration drive power, the efficiency being calculated from these values and used as the basis for a go/no-go test with respect to a pre-established threshold value.

If, at step C9, the result of the judgment is that a problem occurred (NG result), this power generation efficiency of the running motor 2 causes an NG (no-go) flag to be set to on at step C10, and the running motor 2 power generation no-go result is displayed at step C11. If however, the judgment at step C9 is that no problem occurs (OK result), the running motor 2 power generation ok result is displayed at step C12.

Figure 7:
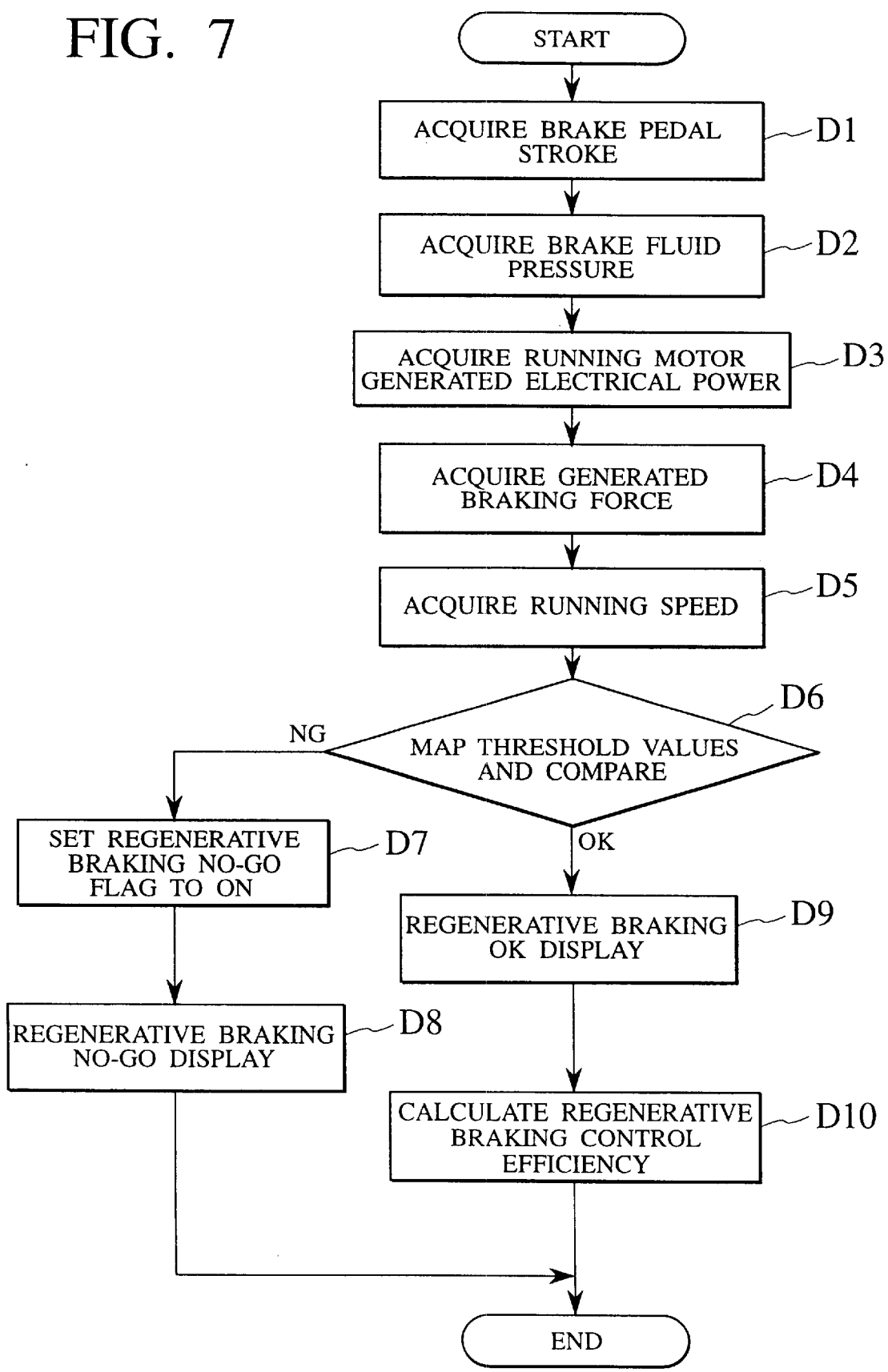
FIG. 7 is a flowchart of a process for the testing system to determine a regenerative braking control efficiency of the hybrid vehicle.

FIG. 7 is a flowchart that shows the process of detecting the regenerative braking efficiency of the hybrid vehicle HV. At steps D1, D2, and D3, the stroke of the brake pedal 9, the brake fluid pressure, and the electrical power generated by the running motor 2, respectively, are acquired as data measured at the vehicle. At steps D4 and D5, generated braking force and running speed, respectively, are acquired as data measured at the chassis dynamometer. At step D6, a comparison is made between the regenerative braking control efficiency and a threshold value map. At this step D6, the relationship between the stroke of the brake pedal 9 and the amount of electrical power generated in the test running mode, the brake fluid pressure, and the running speed and the generated braking force is mapped, and a comparison is performed with respect to a designed (threshold) value.

At step D6, if a judgment is made that a problem occurred (NG result), the regenerative braking no-go result sets an NG (no-go) flag to on, and a no-go regenerative braking result is displayed at step D8. If, however, the judgment at step D6 is that there was no problem (OK result), the display is made at step D9 that the regenerative braking was ok, and the regenerative braking control efficiency is calculated at step D10. That is, at step D10 a calculation is made as to the efficiency of converting kinetic energy into electrical energy when decelerating.

Figure 8:
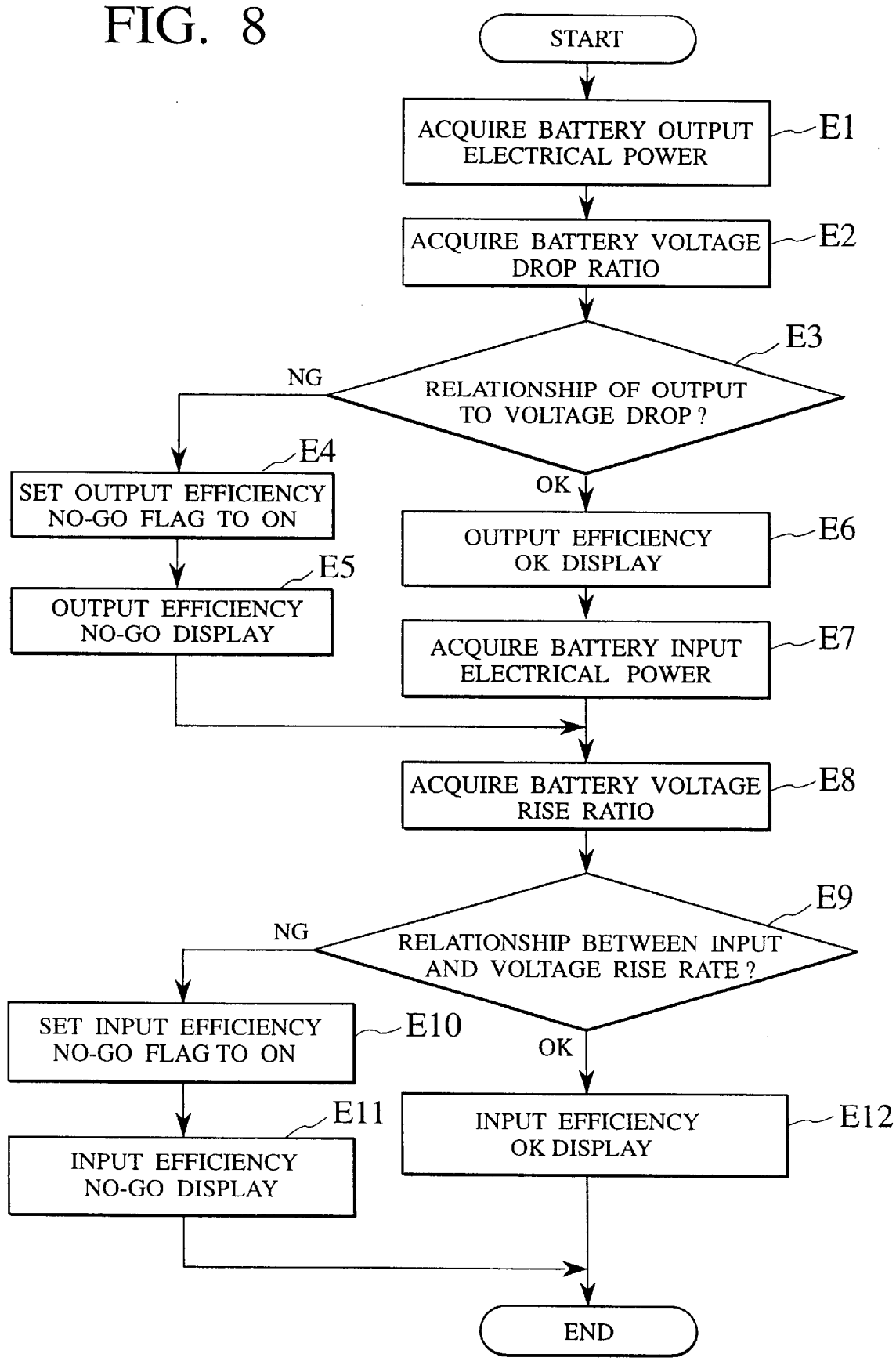
FIG. 8 is a flowchart of a process for the testing system to determine a charge discharge efficiency (SOC) of the battery of the hybrid vehicle.

FIG. 8 is a flowchart that shows the process of detecting the charging and discharging efficiency of the battery 6 of the hybrid vehicle HV. At steps E1 and E2, the output electrical power of the battery 6 and the voltage drop ratio of the battery 6, respectively, are acquired as data measured at the vehicle, and at step E6 a go/no-go judgment is made, based on the relationship between the output and the voltage drop ratio, that is, based on the output efficiency of the battery 6.

If the judgment is made at step E3 that the output efficiency of the battery 6 is abnormal (NG result), this output efficiency causes an NG (no-go) flag co be set to on at step E4, and a display of the no-go condition for battery output efficiency is made at step E5, If however, the judgment is made at step E3 that there was no problem with the output efficiency (OK result), a display is made at step E6 that the output efficiency of the battery 6 was normal, and control proceeds to step E7.

At step E7 and E8, the input voltage of the battery 6 and the voltage rise ratio of the battery 6, respectively, are acquired as data measured at the vehicle. Then, at step E9, a go/no-go test is performed of the relationship between the input and the voltage rise ratio, this being the input efficiency of the battery 6, with respect to a threshold value.

If at step E6 the judgment is made that there was a problem with the input efficiency of the battery 6 (NG result), at step E10 this input efficiency no-go result causes al NG flag to be set to on, and at step E11 a display is made that the result of the test of the input efficiency was no-go. If, however, the judgment at step E9 was that the input efficiency of the battery 6 was normal (OK result), at step E12 a display is made that the input efficiency of the battery 6 was normal.

Figure 9:
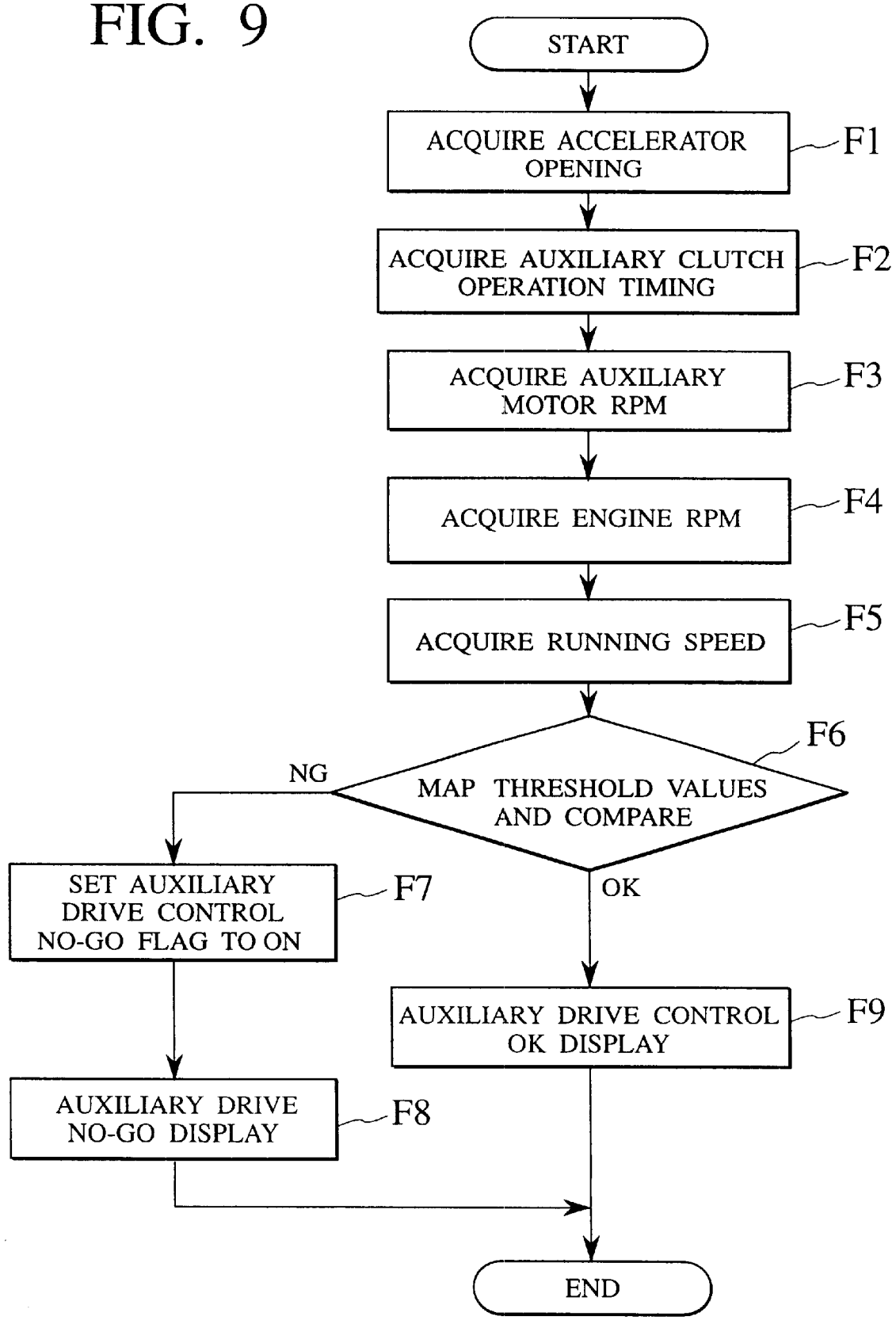
FIG. 9 is a flowchart of a process for the testing system to determine an drive control status of auxiliary equipment of the hybrid vehicle.

FIG. 9 is a flowchart that shows the process of detecting the auxiliary drive control condition in the hybrid vehicle HV. At steps F1, F2, F3, and F4, the accelerator 8 input (opening), the auxiliary equipment clutch 4 operation timing, the rpm of the auxiliary motor 5, and the rprn of the engine 1, respectively, are acquired as data measured at the vehicle. At step F5 the running speed is acquired as data measured at the chassis dynamometer, and then at step F6 a comparison is made between the value obtained and a threshold value. That is, at step F6, a go/no-go test is performed of the drive control condition of the auxiliary equipment by making a comparison of the operational timing of the auxiliary clutch 4 for a given running speed and opening of accelerator 8, the rpm of the auxiliary motor 5, and the rpm of the engine 1, against threshold values.

Then, if the judgment made at step F6 is that a problem occurred (NG result), at step F67 an NG (no-go) flag indicating the abnormal drive control condition is set to on, and at step F8 a display is made of the no-go result of the test of the auxiliary equipment drive condition. If, however, the judgment is made at step F6 that there was no problem (OK result), a display is made of the "go" result of the test of the auxiliary equipment drive control at step F9.

Figure 10:
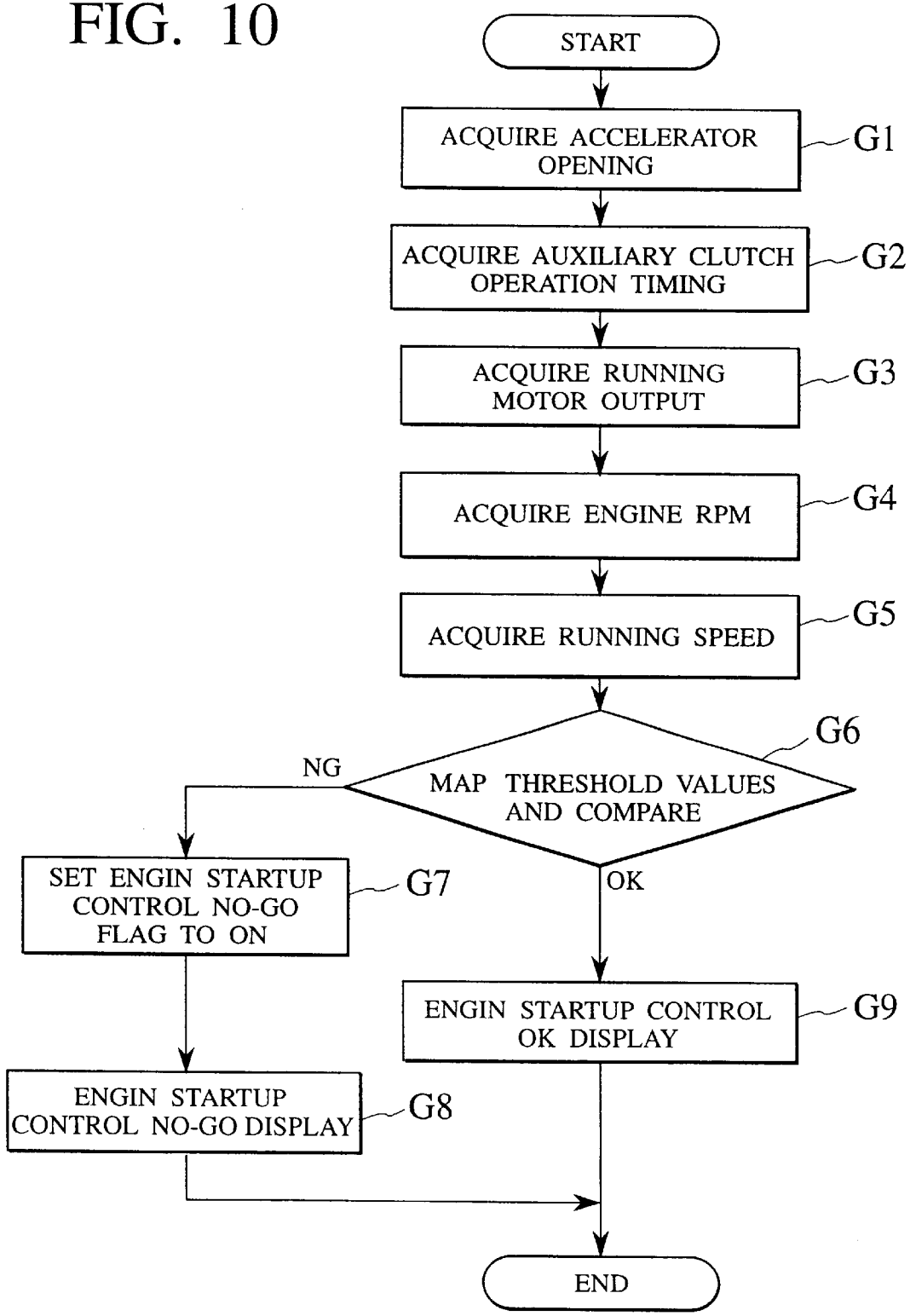
FIG. 10 is a flowchart of a process for the testing system to determine a startup control status of the engine of the hybrid vehicle.

FIG. 10 is a flowchart that shows the process of detecting the startup control condition of the hybrid vehicle HV. At steps G1, G2, G3, and G4, the input (opening) of the accelerator 8, the operation timing of the auxiliary clutch 4, the output of the running motor 2 and the rpm of the engine 1, respectively, are acquired as data measured at the vehicle. At step G5 the running speed is acquired as data measured at the chassis dynamometer, and at step G6 a comparison is made between measured and threshold values. Essentially, at step G6, using the input (opening) of the accelerator 8 and the running speed, a no/no-go test of the engine startup control condition is performed by comparing the operational timing of the auxiliary clutch 4 that corresponds to the output of the engine 2, and the rpm of the engine 1 with a threshold value.

Then, if at step G6 the judgment is made that a problem occurred (NG result), at step G7 this engine startup control condition causes the setting of an NG (no-go) flag, and at step G8 a display is made that indicates the no-go status of the engine startup control condition. If, however, the judgment is made at step G6 that no problem occurred (OK result), at step G9 an output is made that indicates a normal engine 1 startup control condition.

Figure 11:
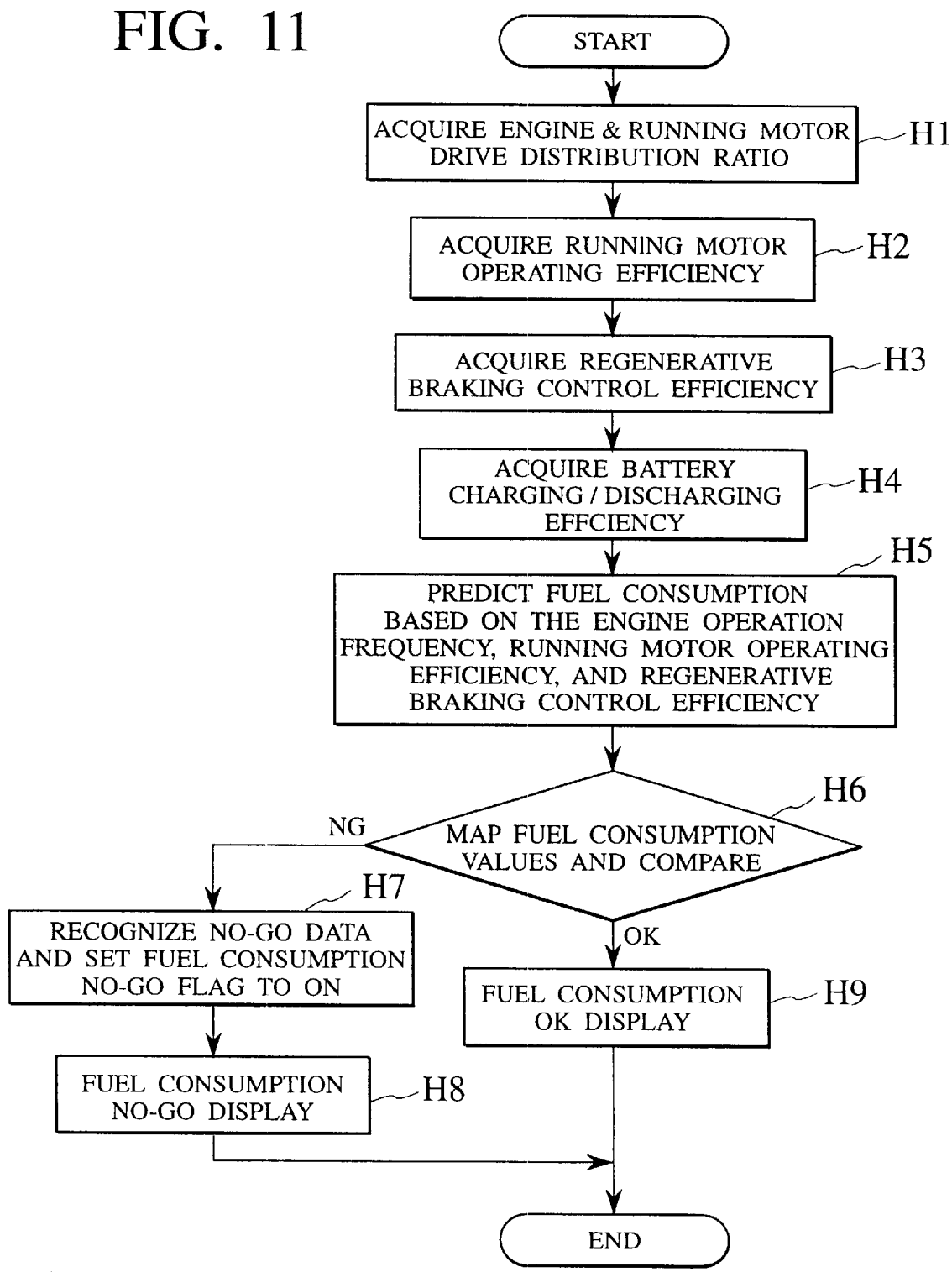
FIG. 11 is a flowchart of a process for the testing system to determine a fuel consumption rate of the hybrid vehicle.

FIG. 11 is a flowchart that shows the process of detecting the fuel consumption of the hybrid vehicle HV. In this process, at step H1 the drive distribution ratio of the engine 1 and the running motor 2 are acquired according to process shown in FIG. 4, at step H2, the operating efficiency of the running motor 2 is acquired according to the process shown in FIG. 6, at step H3 the regenerative braking control efficiency is acquired according to the process shown in FIG. 7, and at step H4, the charge discharge efficiency of the battery 6 is acquired according to the process shown in FIG. 8. Then, at step H5, the fuel consumption rate is predicted by means of the operating frequency of the engine 1, the operating efficiency of the running motor 2, and the regenerative braking control efficiency. At step H6, the relationship between the running mode and the fuel consumption is mapped, and a comparison is made wit the test values obtained and a threshold value map.

At step H6, if a judgment is made that a problem occurred with fuel consumption (NG result), at step H7 the problem data is recognized, and an NG (no-go) flag that indicates the fuel consumption problem is set to on, after which at step H8 a display is made that indicates this "no-go" fuel consumption test result. If, however, the judgment made at step H6 is that a fuel consumption problem did not occur, at step H9 a display is made that indicates that the fuel consumption was normal.

In this manner, according to the-described processes, quantitative evaluations are obtained of the drive distribution and drivability of the engine 1 and the running motor 2, the operating efficiency of the running motor 2 and the battery 6, the regenerative braking control efficiency, the charge discharge efficiency of the battery 6, the drive control condition of the auxiliary equipment, and the startup control condition and fuel consumption of the engine 1.

As will be seen from the foregoing embodiment, in a species of the invention, a comparison is performed between test values, based on the vehicle data and the chassis dynamometer data, and threshold values so as perform testing of the hybrid vehicle.

Accordingly, by performing a comparison between measured and threshold values, it is possible not only to perform a quantitative evaluation of the drive and control systems, but also to facilitate a go/no-go test of the vehicle, based on the measured values.

In such configurations, the sensors may include a vehicular acceleration sensor, a break fluid pressure sensor, a motor coil temperature sensor, an electrical power system water temperature sensor, an engine water temperature sensor, an electronically controlled throttle opening sensor, a crank angle sensor, a primary rpm sensor, a secondary rpm sensor, a line oil pressure sensor, a pump oil pressure sensor, an oil temperature sensor, a powder clutch temperature sensor, a powder clutch current sensor, a three-phase motor current sensor, a DC power sensor, a collision detecting sensor, an overall electrical power voltage sensor, an electric power current sensor, an insulation resistance (insulation deterioration) sensor, a battery module temperature sensor, a battery module voltage sensor, a parking brake switch, an outside air temperature sensor, an accelerator opening sensor, an idle switch, an inhibitor switch, an inverse-logic inhibitor switch, a stop-lamp switch, a box switch, a brake master cylinder pressure sensor, and is vehicle speed sensor.

The measured vehicle data that is obtained from the above-noted sensors may include the running speed, the accelerator input, the brake pedal stroke, the transmission shift position, the brake fluid pressure, the electronically controlled throttle opening, the stepless transmission gear position, the stepless transmission electromagnetic clutch operation, the running motor output power, the running motor generated electrical power, the battery voltage, the battery charging power, the battery discharging power, the auxiliary clutch operation, and the auxiliary motor rpm. Data from the chassis dynamometer includes such data as the running speed, the drive power, and the road load.

In another species, the engine and drive motor drive distribution ratio is detected based on the accelerator input, the electronically controlled throttle opening, and the running motor electrical output power obtained as vehicle data, and the generated drive power and running speed obtained as measured data at the chassis dynamometer.

Accordingly, the distribution of drive power between the engine and the running motor is detected, thereby enabling a quantitative evaluation of the drive distribution ratio.

In another species, the drivability is detected based on the accelerator input, the electronically controlled throttle opening, and the running motor output power obtained as vehicle data, and the measured change in the generated drive power per unit time and change in the running speed per unit time as data measured at the chassis dynamometer.

Accordingly, the drivability when running is detected, thereby enabling a quantitative evaluation of drivability.

In another species, the running motor and battery operating efficiencies are detected, based on the output electrical power of the running motor and the generated electrical power as measured vehicle data, and on the generated drive power and deceleration drive power obtained as measured data at the chassis dynamometer.

Accordingly, the running motor and battery operating efficiencies are detected, thereby enabling a quantitative evaluation of the operating efficiencies.

In another species, the regenerative braking control efficiency is detected, based on the brake pedal stroke, the brake fluid pressure, and the running motor generated electrical power as measured vehicle data, and on the generated control power and running speed measured at the chassis dynamometer.

Accordingly, the regenerative braking control efficiency is detected, enabling a quantitative evaluation of the regenerative braking control efficiency.

In another species, a charge discharge efficiency is detected, based on The battery electrical output power, voltage drop ratio, input electrical power, and voltage increase ratio measured at the vehicle.

Accordingly, the battery charge discharge efficiency is detected, enabling a quantitative evaluation of the battery charge discharge efficiency.

In another species, the auxiliary equipment drive control condition is detected, based on the accelerator input, the auxiliary equipment clutch operation timing, the auxiliary equipment motor rpm, and the engine rpm measured as vehicle data, and on the running speed measured at the chassis dynamometer.

Accordingly, the auxiliary equipment drive control condition is detected, thereby enabling a quantitative evaluation of the associated drive control condition.

In another species, the engine startup control condition is detected, base on the accelerator input, the auxiliary equipment clutch operation timing, the running motor output, and the engine rpm, measured as vehicle data, and on the running speed measured at the chassis dynamometer.

Accordingly, the engine startup control condition is detected, thereby enabling a quantitative evaluation of engine startup control.

In another species, the fuel consumption is detected, based on the engine and motor drive distribution ratio as detected in the third aspect of the invention, the running motor operating efficiency as detected in the fifth aspect of the invention, the regenerative braking control efficiency as detected in the sixth aspect of the invention, and the battery charge discharge efficiency as detected in the seventh aspect of the invention.

Accordingly, the fuel consumption is detected, thereby enabling a quantitative evaluation of fuel consumption.

The contents of Japanese Parent Application No. 10-265324 are incorporated herein by reference.

While preferred embodiments of the present invention have been described using specific terms, such description is for illustrative purposes, and it is to be understood that changes and variations may be made without departing from the spirit or scope of the following claims.

What is claimed is:

1. A testing method of testing a hybrid electric vehicle which runs under integrated control of an engine, an electric motor and an auxiliary motor for run and which includes drive and control systems therefore the testing method comprising the steps of:

having the hybrid electric vehicle running on a stationary running tester;

acquiring:
first data on the running vehicle by access to sensors in the vehicle, the first data including an accelerator input, an auxiliary clutch operation timing, an rpm of the auxiliary motor, an rpm of the engine, an electronically controlled throttle opening, and output power of the electric motor; and
second data on the running vehicle by measurements thereto at the stationary running tester, the second data including a running speed and generated drive torque;

analyzing the first and second data to detect a problem with the drive and control systems; and determining a drive control status of the auxiliary motor and a drive distribution ratio between the engine and the electric motor, based on the analysis of the first and second data.

2. The testing method of claim 1, comprising:
   determining an inspection value based on the first and second data; and
   comparing the inspection value with a threshold value.

3. A testing method of testing a hybrid electric vehicle which runs under integrated control of an engine, an electric motor and an auxiliary motor for run and which includes drive and control systems therefor, the testing method comprising the steps of:
   having the hybrid electric vehicle running on a stationary running tester;
   acquiring:
      first data on the running vehicle by access to sensors in the vehicle, the first data including an accelerator input, an auxiliary clutch operation timing, an rpm of the auxiliary motor, an rpm of the engine, an electronically controlled throttle opening, and output power of the electric motor; and
      second data on the running vehicle by measurements thereto at the stationary running tester, the second data including a running speed, a change of generated drive torque per unit time and a change of running speed per unit time;
   analyzing the first and second data to detect a problem with the drive and control systems; and
   determining a drive control status of the auxiliary motor and a drivability of the vehicle, based on the analysis of the first and second data.

4. A testing method of testing a hybrid electric vehicle which runs under integrated control of an engine, an electric motor and an auxiliary motor for run and which includes drive and control systems therefor, the testing method comprising the steps of:
   having the hybrid electric vehicle running on a stationary running tester;
   acquiring:
      first data on the running vehicle by access to sensors in the vehicle, the first data including an accelerator input, an auxiliary clutch operation timing, an rpm of the auxiliary motor, an rpm of the engine, and output power and generated power of the electric motor; and
      second data on the running vehicle by measurements thereto at the stationary running tester, the second data including a running speed, and generated drive torque and deceleration drive torque;
   analyzing the first and second data to inspect detect a problem with the drive and control systems; and
   determining a drive control status of the auxiliary motor and operating efficiencies of the electric motor and a battery, based on the analysis of the first and second data.

5. A testing method of testing a hybrid electric vehicle which runs under integrated control of an engine, an electric motor and an auxiliary motor for run and which includes drive and control systems therefor, the testing method comprising the steps of:
   having the hybrid electric vehicle running on a stationary running tester;
   acquiring:
      first data on the running vehicle by access to sensors in the vehicle, the first data including an accelerator input, an auxiliary clutch operation timing, an rpm of the auxiliary motor, an rpm of the engine, and a brake pedal stroke, a brake fluid pressure, and generated power of the electric motor; and
      second data on the running vehicle by measurements thereto at the stationary running tester, the second data including generated braking torque and a running speed;
   analyzing the first and second data to detect a problem with the drive and control systems; and
   determining a drive control status of the auxiliary motor and a control efficiency of a regenerative brake, based on the analysis of the first and second data.

6. A testing method of testing a hybrid electric vehicle which runs under integrated control of an engine, an electric motor and an auxiliary motor for run and which includes drive and control systems therefor, the testing method comprising the steps of:
   having the hybrid electric vehicle running on a stationary running tester;
   acquiring:
      first data on the running vehicle by access to sensors in the vehicle, the first data including ,an accelerator input, an auxiliary clutch operation timing, an rpm of the auxiliary motor, an rpm of the engine, and output power, a voltage drop rate, input power and a voltage rise rate of a battery and
      second data on the running vehicle by measurements thereto at the stationary running tester, the second data including a running speed;
   analyzing the first and second data to detect a problem with the drive and control systems; and
   determining a drive control status of the auxiliary motor and a charge discharge efficiency of a battery, based on the analysis of the first and second data.

7. A testing method of testing a hybrid electric vehicle which runs under integrated control of an engine, an electric motor and an auxiliary motor for run and which includes drive and control systems therefor, the testing method comprising the steps of:
   having the hybrid electric vehicle running on a stationary running tester;
   acquiring:
      first data on the running vehicle by access to sensors in the vehicle, the first data including an accelerator input, an auxiliary clutch operation timing, output power of the electric motor, an rpm of the auxiliary motor, an rpm of the engine; and
      second data on the running vehicle by measurements thereto at the stationary running tester, the second data including a running speed;
   analyzing the first and second data to detect a problem with the drive and control systems; and
   determining a drive control status of the auxiliary motor and a startup control status of the engine, based on the analysis of the first and second data.

8. A testing method of testing a hybrid electric vehicle which runs under integrated control of an engine, an electric motor and an auxiliary motor for run and which includes drive and control systems therefor, the testing method comprising the steps of:
   having the hybrid electric vehicle running on a stationary running tester;
   acquiring:
      first data on the running vehicle by access to sensors in the vehicle, included, an auxiliary clutch operation timing, an rpm of the auxiliary motor, and an rpm of the engine, the first data having:
         a first part consisting of a combination of an accelerator input, an electronically controlled throttle opening, and output power of the electric motor;

a second part consisting of a combination of output power and generated power of the electric motor;

a third part consisting of a combination of a brake pedal stroke, a brake fluid pressure, and generated power of the electric motor and a fourth part consisting of a combination of output power, a voltage drop rate, input power and a voltage rise rate of a battery; and second data on the running vehicle by measurements thereto at the stationary running tester, the second data having:

a first part consisting of a combination of generated drive torque and a running speed;

a second part consisting of a combination of generated drive torque and deceleration drive torque; and a third part consisting of a combination of generated braking torque and running speed;

analyzing the first and second data to inspect the drive and control systems for a problem including:

determining as third data, a drive distribution ratio between the engine and the electric motor, based on the first parts of the first and second data;

determining, as fourth data, operating efficiencies of the electric motor and the battery, based on the second parts of the first and second data;

determining, as fifth data, a control efficiency of a regenerative brake, based on the third parts of the first and second data; and determining, as sixth data, a charge discharge efficiency of the battery based on the fourth part of the first data; and determining a drive control status of the auxiliary motor and a startup control status of the engine, based on the analysis of the first and second data including determining a fuel consumption rate based on the third to the sixth data.

9. A testing system for testing a hybrid electric vehicle which runs under integrated control of an engine, an electric motor and an auxiliary motor for run and which includes drive and control systems therefor, the testing system comprising:

a stationary running tester for the hybrid electric vehicle to run thereon;

a first data acquisition system to acquire first data on the hybrid electric vehicle running on the stationary running tester by access to sensors in the vehicle, the first data including an accelerator input, an auxiliary clutch operation timing, an rpm of the auxiliary motor, an rpm of the engine, an electronically controlled throttle opening, and output power of the electric motor;

a second data acquisition system to acquire second data on the hybrid electric vehicle running on the stationary running tester by measurements thereto at the stationary running tester, the second data including a running speed and generated drive torque; and an analysis system to analyze the first and second data for an inspection of the drive and control systems, for a problem and a status determiner to determine a drive control status of the auxiliary motor and a drive distribution ratio between the engine and the electric motor, based on the analysis of the first and second data.

10. A testing system for testing a hybrid electric vehicle which runs under integrated control of an engine, an electric motor and an auxiliary motor for run and which includes drive and control systems therefor, the testing system comprising:

a stationary running tester for having the hybrid electric vehicle running thereon;

first data acquisition means for acquiring first data on the hybrid electric vehicle running on the stationary running tester by access to sensors in the vehicle, the first data including an accelerator input, an auxiliary clutch operation timing, an rpm of the auxiliary motor, and an rpm of the engine, an electronically controlled throttle opening, and output power of the electric motor;

second data acquisition means for acquiring second data on the hybrid electric vehicle running on the stationary running tester by measurements thereto, the second data including a running speed and generated drive torque; and analysis means for analyzing the first and second data to detect a problem with the drive and control systems; and status determining means for determining a drive control status of the auxiliary motor and a drive distribution ratio between the engine and the electric motor, based on the analysis of the first and second data.

* * * * *